Apr. 17, 1923.
E. H. SAVAGE
1,452,171
TRACK LAYING TRACTOR
Filed Feb. 28, 1921
4 Sheets-Sheet 1
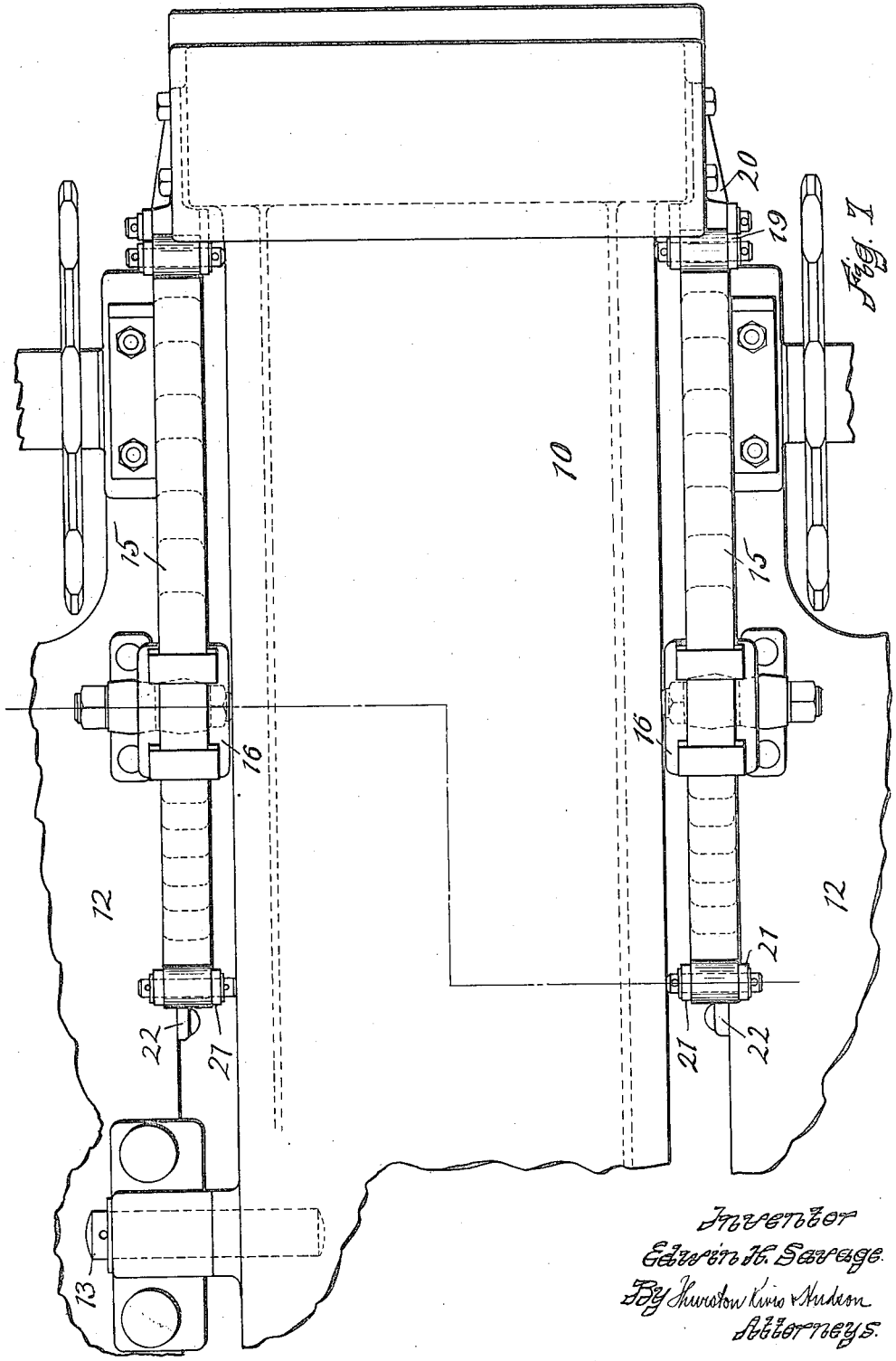

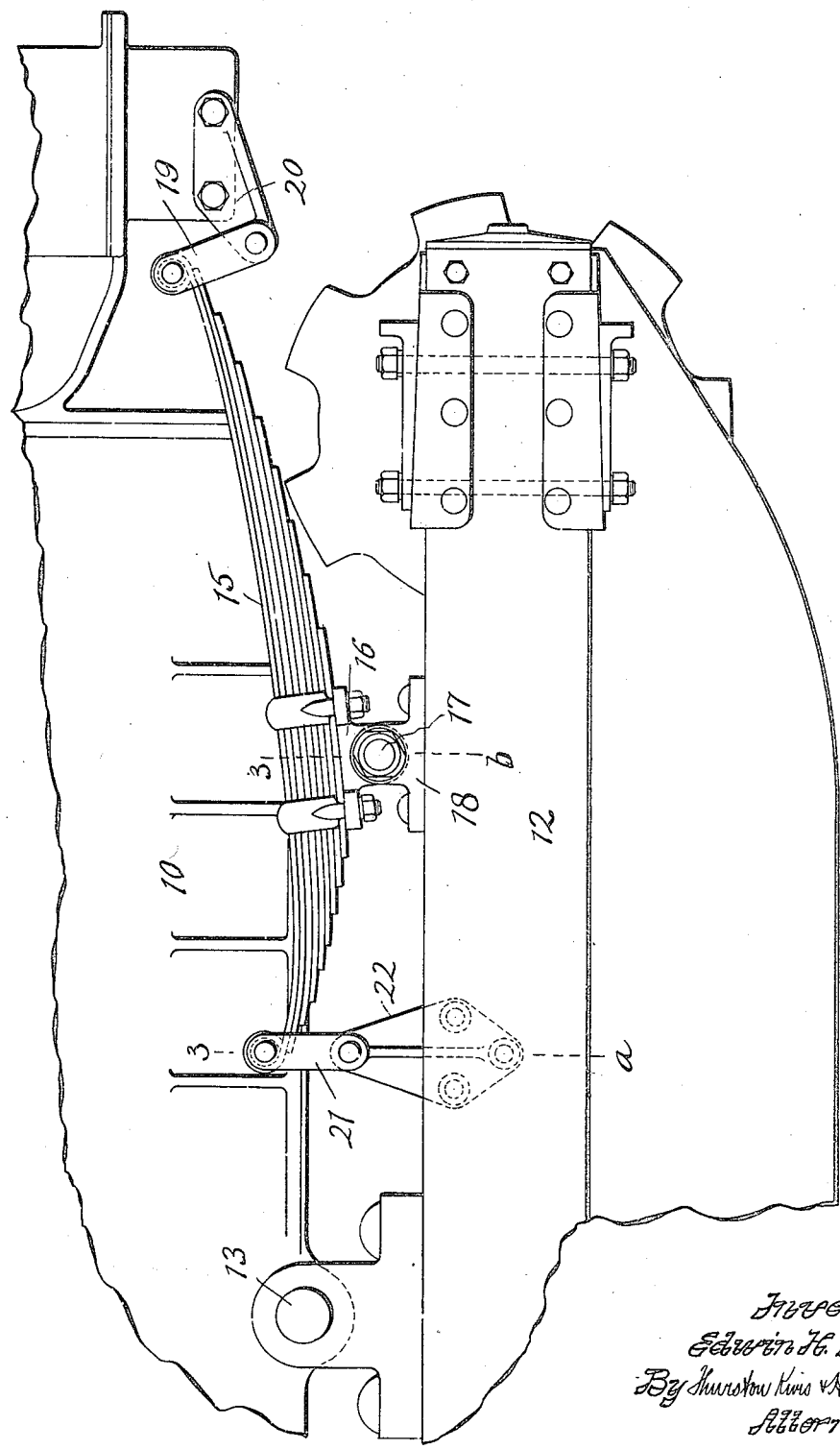

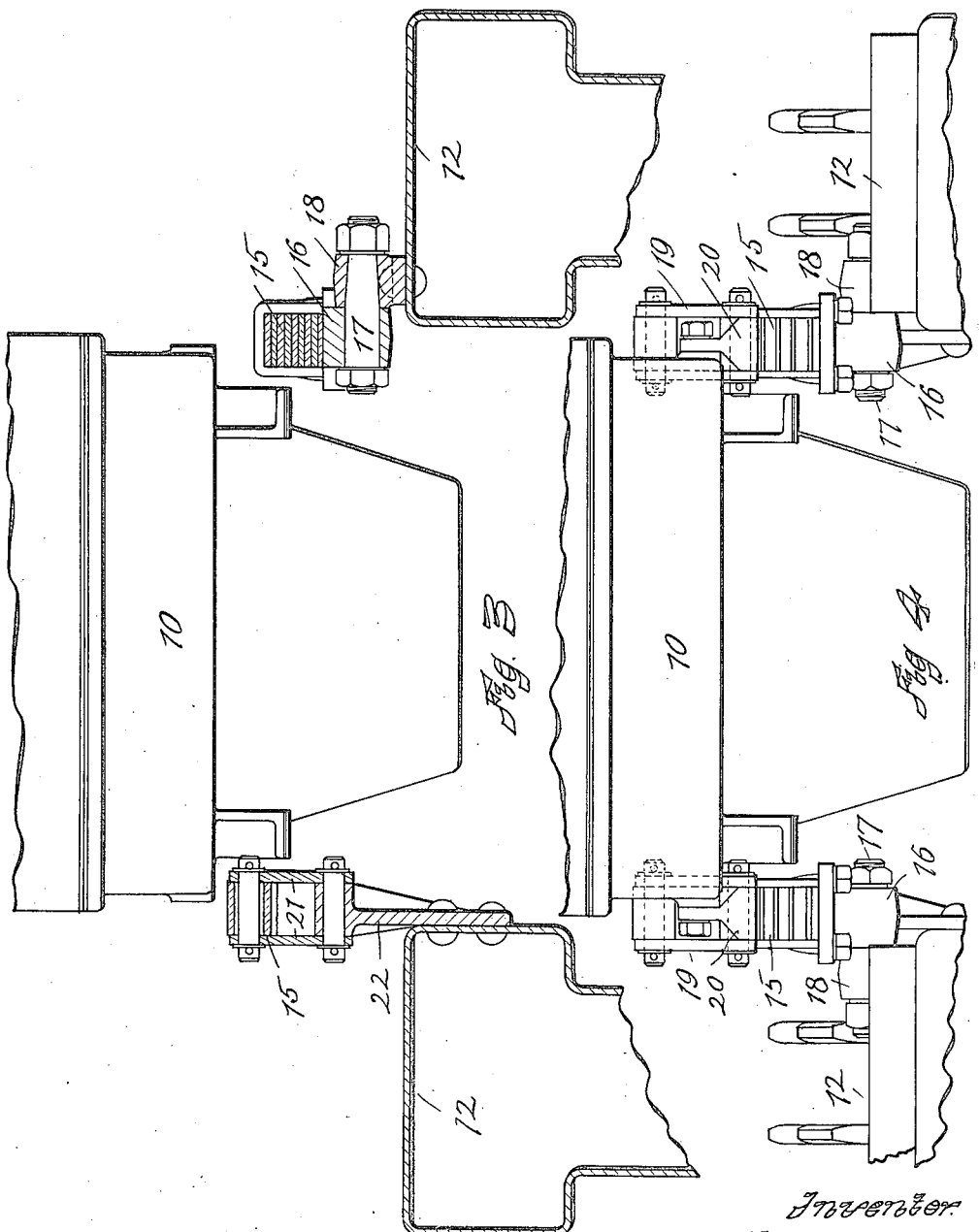

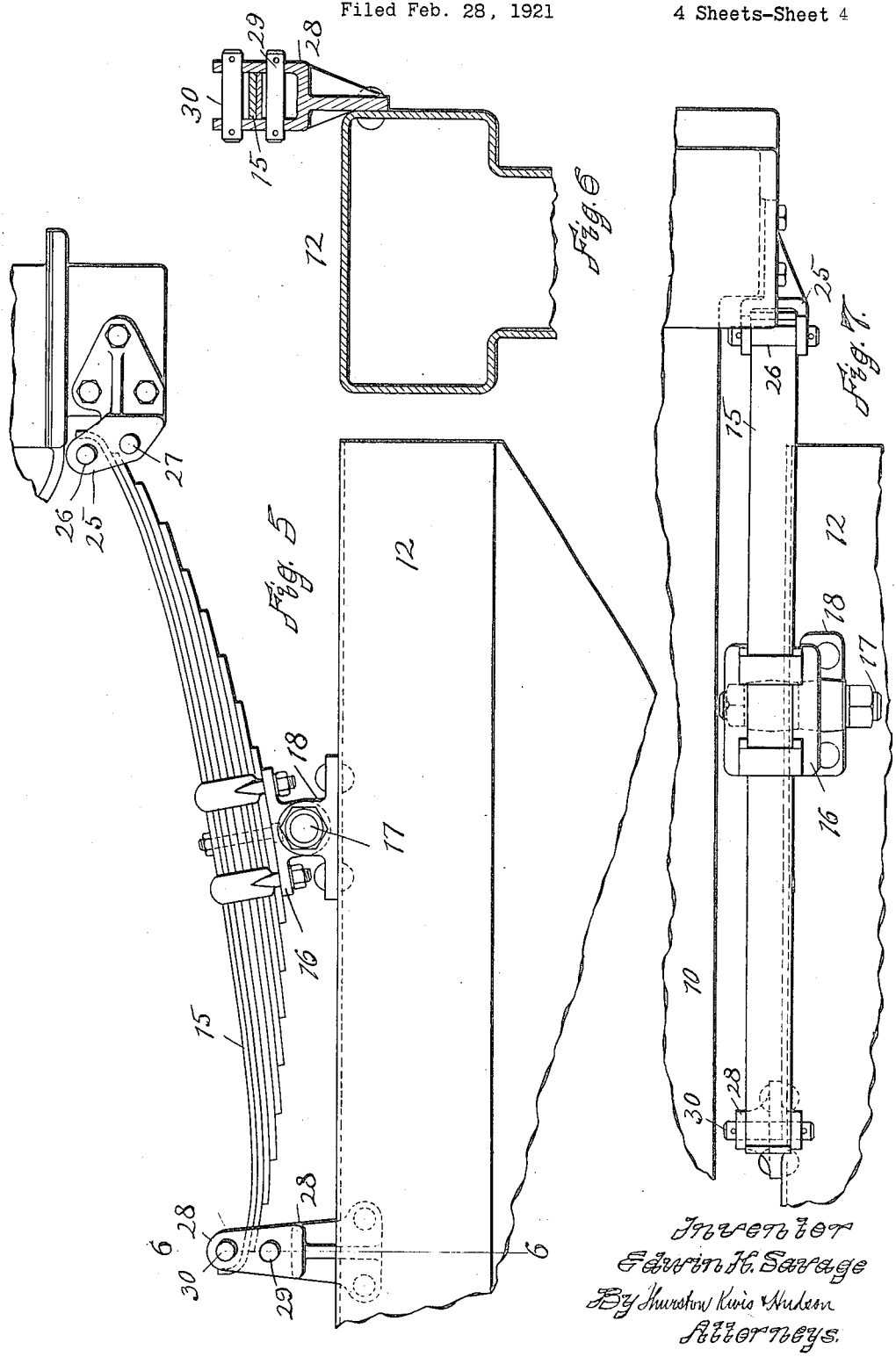

Patented Apr. 17, 1923.

1,452,171

UNITED STATES PATENT OFFICE.

EDWIN H. SAVAGE, OF CLEVELAND, OHIO, ASSIGNOR TO THE CLEVELAND TRACTOR COMPANY, OF EUCLID, OHIO, A CORPORATION OF OHIO.

TRACK-LAYING TRACTOR.

Application filed February 28, 1921. Serial No. 448,466.

*To all whom it may concern:*

Be it known that I, EDWIN H. SAVAGE, a citizen of the United States, residing at Cleveland, in the county of Cuyahoga and State of Ohio, have invented a certain new and useful Improvement in Track-Laying Tractors, of which the following is a full, clear, and exact description.

This invention relates to the kind of track laying tractors in which there is a main motor supporting frame, and, on each side thereof, a longitudinally extended track structure between which and the main frame there are two load supporting connections one near the front and one near the rear end of said endless track structure. Generally the endless track structure includes a rigid side frame which is pivoted near its rear end to the main frame said pivot providing one of the load supporting connections. Between the front end of this track frame and the main frame a spring suspension is usually employed as the front load supporting connection between the endless track structure and the main frame. This invention relates to the front load supporting connection referred to which connection is commonly called the front spring suspension.

The object of the invention is to provide an efficient front spring suspension at reasonable cost which will also prevent lateral movement of the front ends of the frame structure relative to the main frame.

The invention consists in the construction and combination of parts shown in the drawings and hereinafter described and set forth definitely in the appended claims.

In the drawings, Fig. 1 is a plan view of the invention; Fig. 2 is a side elevation thereof; Fig. 3 is a front elevation showing the spring suspension on the left side sectioned in the plane indicated by line 3—a on Fig. 2, and a spring suspension on the right side sectioned in the plane indicated by line 3—b on Fig. 2. Fig. 4 is a front elevation of the invention; Fig. 5 is a side elevation showing a modified construction; Fig. 6 is a sectional front elevation in the plane of line 6—6 on Fig. 5, Fig. 7 is a plan view of the spring suspension on one side of the track.

Referring to the parts by reference characters, 10 represents the main motor supporting frame which may be of any suitable rigid construction, 12—12 represent the side frame members of the endless track structures, which frame members are located on opposite sides of the main frame. These side frames are pivotally connected near their rear ends with the main frame on horizontal laterally extended aligned pivots 13.

The front end of the main frame is supported from the front part of the said track frame by two spring suspension devices which are exactly alike, one being associated with each of the track frames. This spring suspension includes a semi-elliptical leaf spring 15 which is rigidly secured near its middle upon a spring bracket 16, which bracket has a pivotal connection with the side frame. Specifically, it is pivotally connected by means of a pivot 17 with a bracket 18 secured to the side frame member so as to extend inward therefrom substantially as shown. The rear end of the spring is likewise connected with the side frame 12, the connections consisting of a bracket 22 fixed to the inner side of said track frame, and extending inward therefrom so as to be in alignment with the bracket 18. This bracket 22 and the rear end of the spring are connected by a shackle 21. The front end of the spring, however, is connected with the main frame, the connection consisting of a bracket 20 which is secured to a part of the main frame and extends outward therefrom so as to be in alignment with the brackets 18, 22, and a shackle 19 which connects bracket 20 with the front end of an elliptical spring.

The specific construction described is that shown in Figs. 1 to 4 inclusive. Figs. 5 to 7 inclusive show a modified construction, the difference being that the shackle links are omitted, and the brackets 20 and 22 are slightly modified in form so that they permit the use of an equivalent connection between them and the ends of said spring.

In the construction shown in Figs. 5 to 7, the bracket 28 which corresponds with bracket 22 in the first described construction is forked. The rear end of the spring goes between the two forks of this bracket and likewise between two transversely extended pins 29, 30 which extend between and are secured to the two forks. At the front end of the spring there is a bracket 25 which corresponds in function with the bracket 20 of the first described construction. This is also bifurcated and the front end of the spring passes between the two forks and also between two transversely extended pins 26, 27, which extend between and are secured to said forks.

Both constructions operate similarly to produce the same results, that is, each affords a suitable spring suspension between one of the side frame members and the front end of the main frame, said spring suspension including a leaf spring pivotally connected near its middle with the track frame and having an operative connection between its rear end and the track frame, and between its front end and the main frame, the two latter connections being such as substantially compel the track frame as it moves up and down relative to the main frame to have no lateral motion.

Having described my invention, I claim:—

1. In a track laying tractor, the combination of a main frame, two endless track structures which lie on opposite sides of the main frame, a load supporting connection between the main frame and each endless track structure near the rear end of the latter, and an independent spring suspension between the main frame and the front end of each endless track structure, each of said spring suspensions consisting of a leaf spring which near its middle has a pivotal connection with the endless track structure and has an operative connection at its rear end with the endless track structure and an operative connection at its front end with the main frame.

2. In a track laying tractor, the combination of a main frame and two side frames lying on opposite sides thereof and pivoted near their rear ends to the main frame on transverse horizontal aligned pivots, and, associated with the front end of each track frame, a leaf spring which adjacent its middle is pivoted on a horizontal transverse axis to the side frame and has an operative connection at its rear end with the side frame and at its front end with the main frame.

3. In a track laying tractor, the combination of a main frame and two endless track structures which lie on opposite sides of the main frame each including a rigid side frame member which near its rear end is pivotally connected on a transverse horizontal pivot with the main frame, and the following mechanism for connecting the front end of each track frame with the front part of the main frame comprising a bracket fixed to the track frame and overhanging the inner edge thereof, a second bracket fixed to the track frame behind the first named bracket and overhanging the inner edge thereof, a bracket fixed to the main frame and projecting outwardly therefrom, a leaf spring, a spring seat bracket to which it is fixed and which is pivoted to the bracket first referred to connected with the track frame, connections between the front end of said leaf spring, and the bracket attached to the main frame and connections between the rear end of the leaf spring and the bracket attached to the track frame.

4. In a track laying tractor, the combination of a main frame, two endless track structures which lie on opposite sides of the main frame, load supporting connections between the main frame and each endless track structure near one end of the latter, and an independent spring suspension between the main frame and an end of each endless track structure, each of said spring suspensions consisting of a leaf spring which near its middle is secured with the endless track structure and has an operative connection at one end with the endless track structure and an operative connection at its opposite end with the main frame.

5. In a track laying tractor, the combination of a main frame, two endless track structures which lie on opposite sides of the main frame, load supporting connections between the main frame and each endless track structure near the rear end of the latter, and an independent spring suspension between the main frame and the front end of each endless track structure, each of said spring suspensions consisting of a leaf spring which near its middle is secured with the endless track structure and has an operative sliding connection at one end with the endless track structure and an operative sliding connection at its opposite end with the main frame.

In testimony whereof, I hereunto affix my signature.

EDWIN H. SAVAGE.